(12) United States Patent
Vishnia

(10) Patent No.: US 11,520,088 B2
(45) Date of Patent: Dec. 6, 2022

(54) UNIVERSAL POST-MOUNTED RETROREFLECTOR

(71) Applicant: PLX, Inc., Deer Park, NY (US)

(72) Inventor: Itai Vishnia, Setauket, NY (US)

(73) Assignee: PLX, INC., Deer Park, NY (US)

( * ) Notice: Subject to any disclaimer, the term of this patent is extended or adjusted under 35 U.S.C. 154(b) by 297 days.

(21) Appl. No.: 16/902,757

(22) Filed: Jun. 16, 2020

(65) Prior Publication Data

US 2021/0124101 A1    Apr. 29, 2021

Related U.S. Application Data

(60) Provisional application No. 62/926,261, filed on Oct. 25, 2019.

(51) Int. Cl.
   *G03G 15/04* (2006.01)
   *G02B 5/132* (2006.01)
   *G02B 7/182* (2021.01)

(52) U.S. Cl.
   CPC .............. *G02B 5/132* (2013.01); *G02B 7/182* (2013.01)

(58) Field of Classification Search
   USPC .......................................................... 359/515
   See application file for complete search history.

(56) References Cited

U.S. PATENT DOCUMENTS

| | | | |
|---|---|---|---|
| 5,122,901 A | 6/1992 | Bleier | |
| 5,335,111 A | 8/1994 | Bleier | |
| 6,473,185 B2 | 10/2002 | Vishnia et al. | |
| 6,550,947 B1 | 4/2003 | Kibayashi | |
| 6,729,735 B2 | 5/2004 | Bleier | |
| 6,752,503 B2 | 6/2004 | Bleier | |
| 6,786,608 B1 | 9/2004 | Bleier | |
| 6,827,455 B2 | 12/2004 | Bleier | |
| 6,945,661 B2 | 9/2005 | Bleier | |

(Continued)

FOREIGN PATENT DOCUMENTS

| | | |
|---|---|---|
| CN | 2233091 Y | 8/1996 |
| CN | 104090316 | 8/2014 |
| CN | 106569324 A | 3/2019 |

OTHER PUBLICATIONS

Authorized Officer Lee Young, International Search Report and Written Opinion issued in counterpart PCT Patent Application No. PCT/US2020/052033 dated Dec. 15, 2020.

*Primary Examiner* — Quana Grainger
(74) *Attorney, Agent, or Firm* — Ice Miller LLP

(57) ABSTRACT

An improved mount assembly for an optical structure, is provided. The mount assembly for the optical structure, comprising an optical structure comprising at least one mirror panel, the mirror panel comprising a reflective surface, a back surface substantially opposite the reflective surface and at least one side surface extending between the reflective and back surfaces, at least one mounting member extending from the optical structure, a housing for receipt therein of at least a portion of the optical structure and all of the mounting member extending from the optical structure, the housing having at least one opening therethrough, and at least one screw received and tightened within the at least one opening such that a first end of the screw presses against and at least partially secures the mounting member within the housing. A method for assembling the same is also provided.

14 Claims, 8 Drawing Sheets

(56) References Cited

U.S. PATENT DOCUMENTS

| | | |
|---|---|---|
| 7,168,817 B2 | 1/2007 | Bleier |
| 7,268,960 B2 | 9/2007 | Vishnia |
| 7,995,208 B2 | 8/2011 | Jacobson et al. |
| 8,083,359 B2 * | 12/2011 | Mohazzab ............. G02B 5/122 359/549 |
| 8,092,030 B2 | 1/2012 | Bleier |
| 8,120,853 B2 | 2/2012 | Jacobson et al. |
| 8,205,852 B2 | 6/2012 | Jacobson et al. |
| 8,205,853 B2 | 6/2012 | Bleier et al. |
| 8,454,176 B2 | 6/2013 | Bleier |
| 8,567,968 B2 | 10/2013 | Bleier |
| 8,827,468 B2 | 9/2014 | Bleier |
| 8,827,470 B2 | 9/2014 | Bleier |
| 8,851,689 B2 | 10/2014 | Bleier et al. |
| 9,013,814 B2 | 4/2015 | Bleier et al. |
| 9,097,586 B2 | 8/2015 | Bleier et al. |
| 9,377,600 B2 | 6/2016 | Vishnia et al. |
| 9,798,051 B2 | 10/2017 | Bleier et al. |
| 10,175,395 B2 | 1/2019 | Bleier et al. |
| 10,222,580 B2 | 3/2019 | Vishnia et al. |
| 10,393,994 B2 | 8/2019 | Bleier et al. |
| 2010/0284181 A1 | 11/2010 | O'Brien et al. |
| 2019/0146181 A1 | 5/2019 | Vishnia et al. |

\* cited by examiner

UNIVERSAL POST-MOUNTED RETROREFLECTOR

STATEMENT OF RELATED CASES

This case claims priority of U.S. 62/926,261, filed Oct. 25, 2019 and which is incorporated by reference herein.

BACKGROUND

This disclosure relates to the field of mounts for optical structures, and in particular, for hollow retroreflectors.

Optical structures such as hollow retroreflectors are old in the art. Hollow retroreflectors are made of three mirror panels joined together, each preferably having an optically flat reflective surface disposed at a right angle to the reflective surface of each of the other two panels. Where all three panels meet can be described as a common inside corner of an imaginary cube, or apex. Hollow retroreflectors have the property of causing incident and reflected light rays to travel along substantially parallel paths.

When hollow retroreflectors are assembled for high accuracy and precision it is important to maintain the mutual perpendicularity of the reflective surfaces and sometimes essential to ensure that the retroreflector as a whole does not move. The perpendicularity of the reflective surfaces is affected by external stresses. With regard to high accuracy and precise reflective panels, such as mirror panels to be used for high accuracy purposes, it is also important to try to maintain as optically flat as possible the reflective surfaces of the panels. Accordingly, external stresses cause distortion to the optical flatness of the reflective surfaces of the reflective panels of a hollow retroreflector and these distortions will then cause distortion to the exiting wavefront of the exiting light rays. Such distortion of the exiting light rays increases beam deviation, thereby causing the exiting light rays to no longer be parallel to the entering (incident) light rays.

Examples of external stresses that can affect the optical flatness of a reflective panel, and/or the perpendicularity of reflective surfaces of abutting reflective panels of a hollow retroreflector, are thermal expansion or contraction of the substrate material from which the panels are made, deflection caused by curing of the adhesives used to join elements together and/or deflection caused by curing of adhesives between, or tightening together of, the reflective panel(s) and the item to which it is mounted and/or the mass of the panels themselves.

Examples of prior art retroreflector mount assemblies that have substantially cured the above external stress issues are found in at least U.S. Pat. Nos. 5,122,901, 5,335,111 and 7,268,960.

SUMMARY

It would be desirable to assemble together the elements of a hollow retroreflector in such a manner as to eliminate or reduce the external stresses. It would also be desirable that the manner of mounting a retroreflector to its mount does not add to these stresses, but nevertheless, securely retain the retroreflector on the mount. Any prior art mounts that may include flexible materials cannot, and do not, maintain the dimensional stability ("DS") such that various forces working on a connected optical structure may be constantly changing the dimensions of that optical structure.

The present mount also achieves secure mounting of the optical structure in a manner designed to help eliminate deflective stresses on the reflective surface(s) of the structure caused by the mounting of the optical structure, such as the retroreflector, to its mount. One or more aspects of the present mount also achieves DS, such that a "hard mount" is achieved. In particular, for the measurement of the DS of a hollow retroreflector and its mounting to another structure, it is important to maintain perfect Optical Path Difference ("OPD") between the incident and reflected light rays. To accomplish this in a hard mount configuration like that of the subject disclosure, it is important that the dimensional relationship between the reflective surfaces of the retroreflector that is attached to another structure via the mounting assembly and the apex of the retroreflector be maintained in all environmental conditions and changes in those environmental conditions.

The mount also allows for easy and secure mounting of the optical structure onto a support structure.

Accordingly, it is an object of the invention to provide an improved mount for an optical structure, and in particular, a retroreflector.

Another object of the invention is to provide an improved mount for an optical structure which causes minimal external stresses to the reflective surfaces of the optical structure.

Still another object of the invention is to provide an improved mount for an optical structure wherein the mount achieves reductions in movement of the optical structure in order to achieve higher-accuracy distance measurements.

Yet a further object of the invention is to provide an improved mount for an optical structure wherein the mounting of the mount and optical structure to a support structure is easy and secure and adds no distortion to any of the wavefronts of the optical structure.

It is even a further object of the invention to provide an improved method of mounting an optical structure using the improved mount.

Other objects of the invention will in part be obvious and will in part be apparent from the following description.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 7:
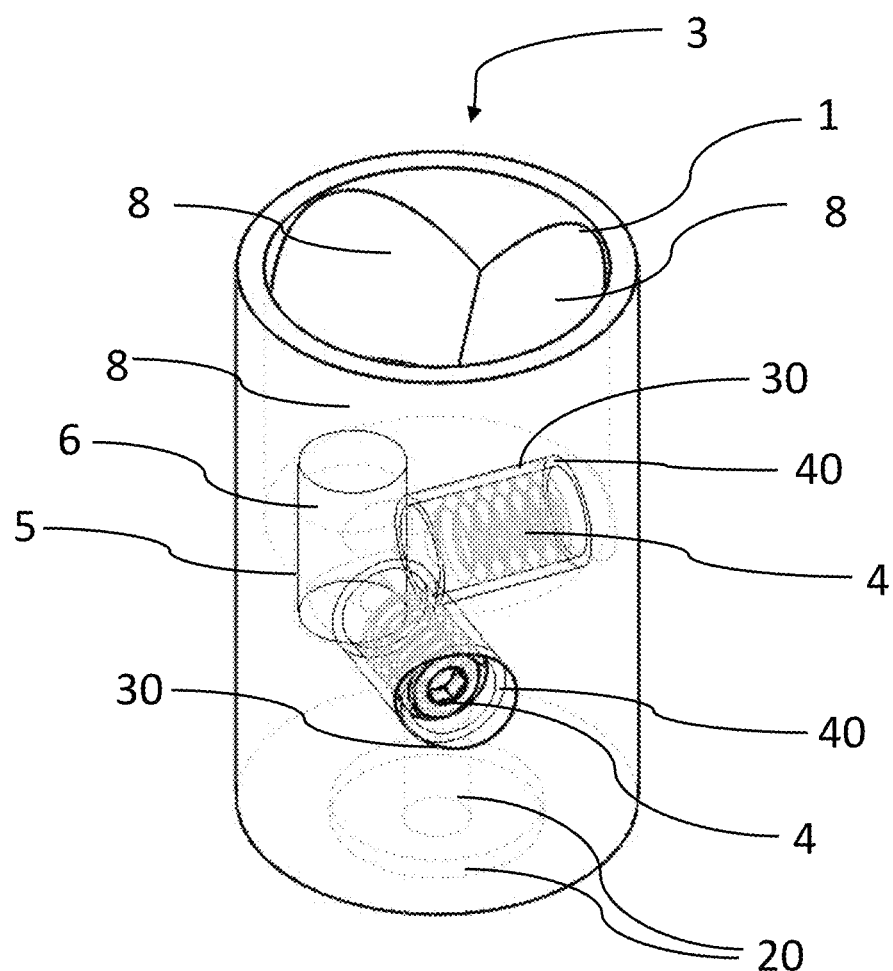
FIG. 7 is a transparent perspective view of another embodiment of the invention.
Figure 8:
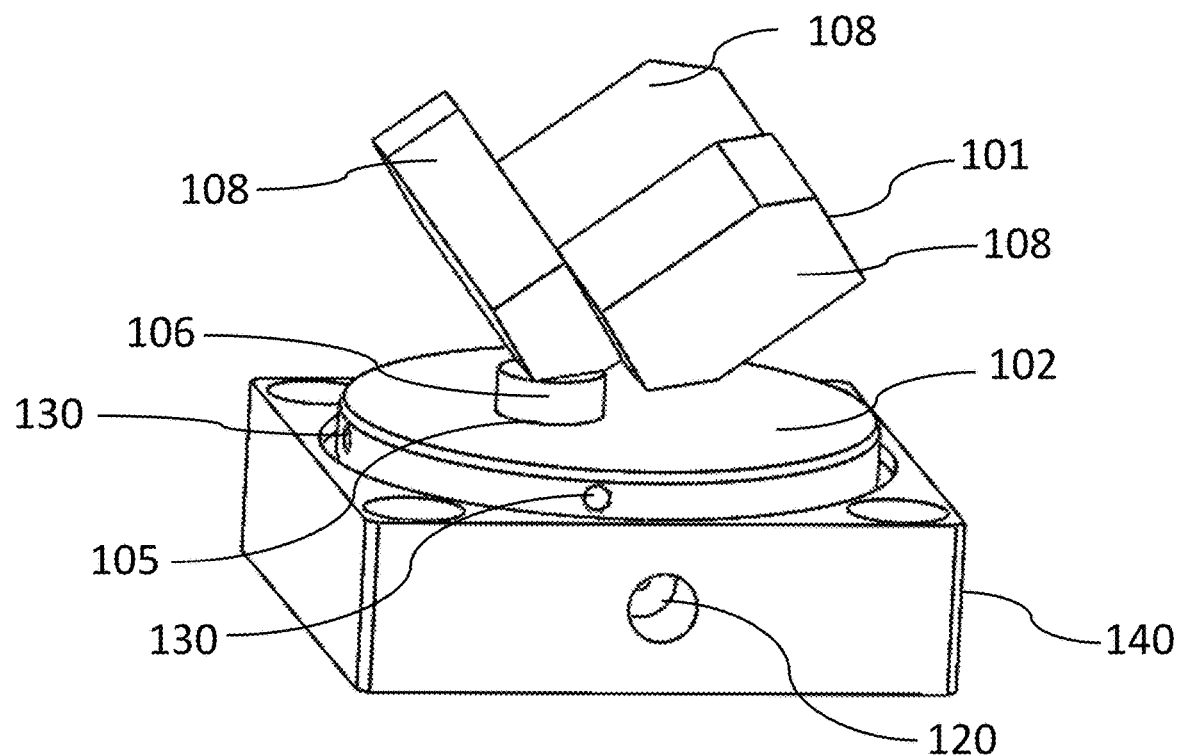
FIG. 8 is a perspective view of yet another embodiment of the invention.

In accordance with the invention, an improved mount for, and method of mounting, an optical structure is provided. A first embodiment of the invention is shown in FIGS. 1-5. A second embodiment of the invention is shown in FIG. 6. A third embodiment of the invention is shown in FIGS. 7 and 8. A fourth embodiment of the invention is shown in FIGS. 10-13.

As is shown in FIGS. 1-5, a retroreflector 1 having a mounting post 6 adhered thereto is secured within a housing 2. This retroreflector to post assembly is then secured within the housing through the tightening against the post of at least one mounting screw 4. Thereafter, the housing having therein the secured retroreflector is itself able to be mounted to another structure for use of the retroreflector in association with that other structure. This housing to external mounting scheme is generally represented in FIGS. 1-5 at 20, which shows known in the art attachment means. Attachment means 20 is anticipated to be any combination of a threaded hole into the bottom of housing 2, or an extending threaded screw for receipt into a cooperating threaded hole of the another structure. It is also anticipated that non-threaded elements be substituted into attachment means 20, and as is known in the art.

Figure 1:
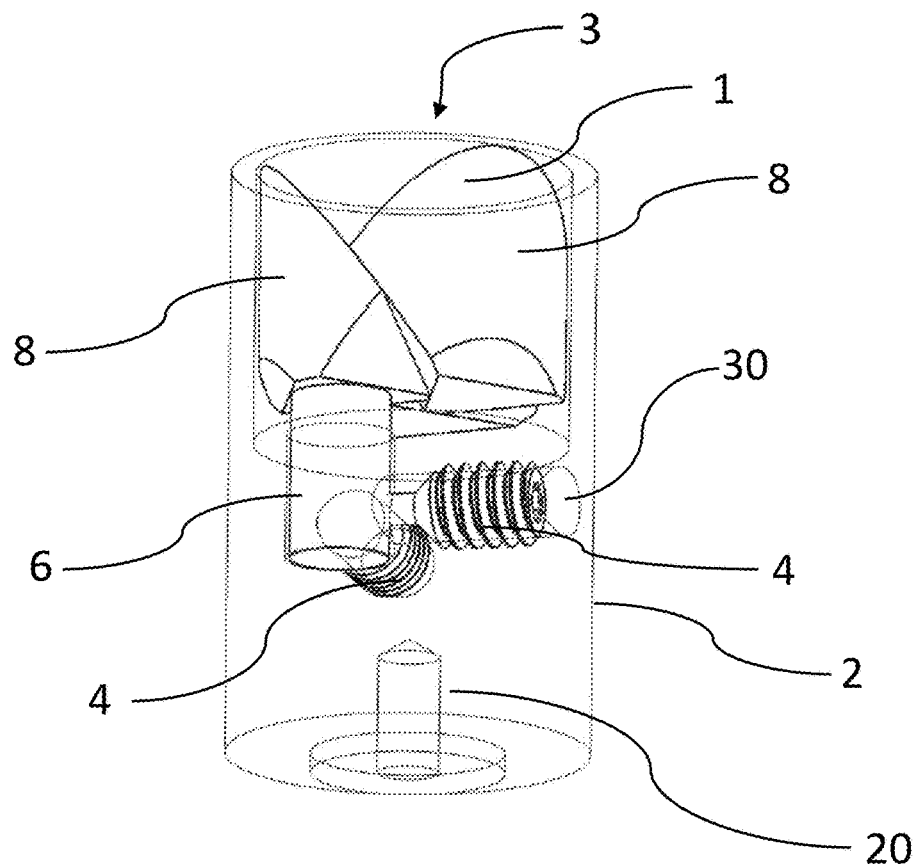
FIG. 1 is a partial transparent perspective view of a first embodiment of the invention.
Figure 2:
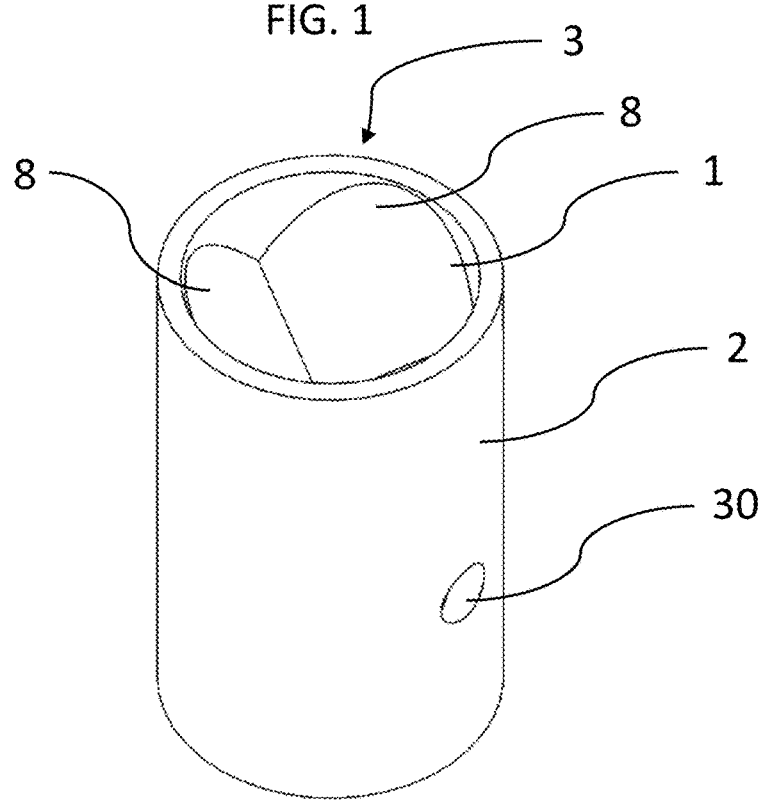
FIG. 2 is a top perspective view of the embodiment of FIG. 1.
Figure 3:
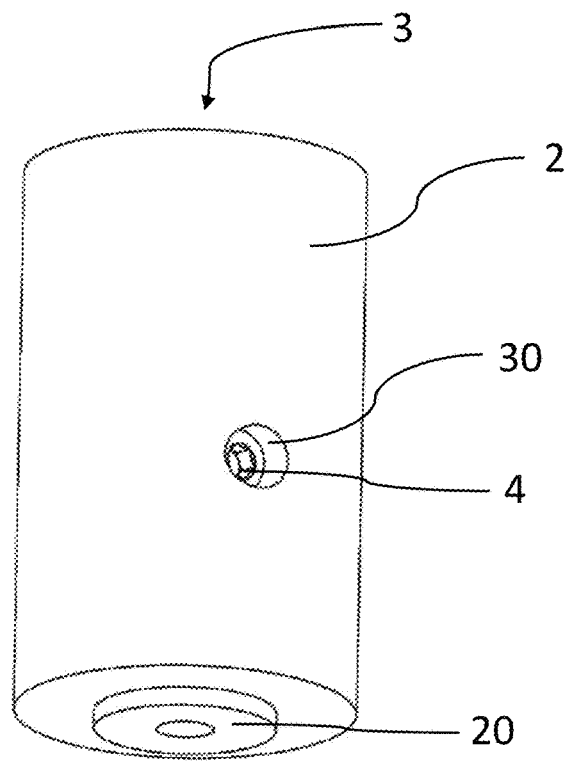
FIG. 3 is a bottom perspective view of the embodiment of FIG. 1.
Figure 4:
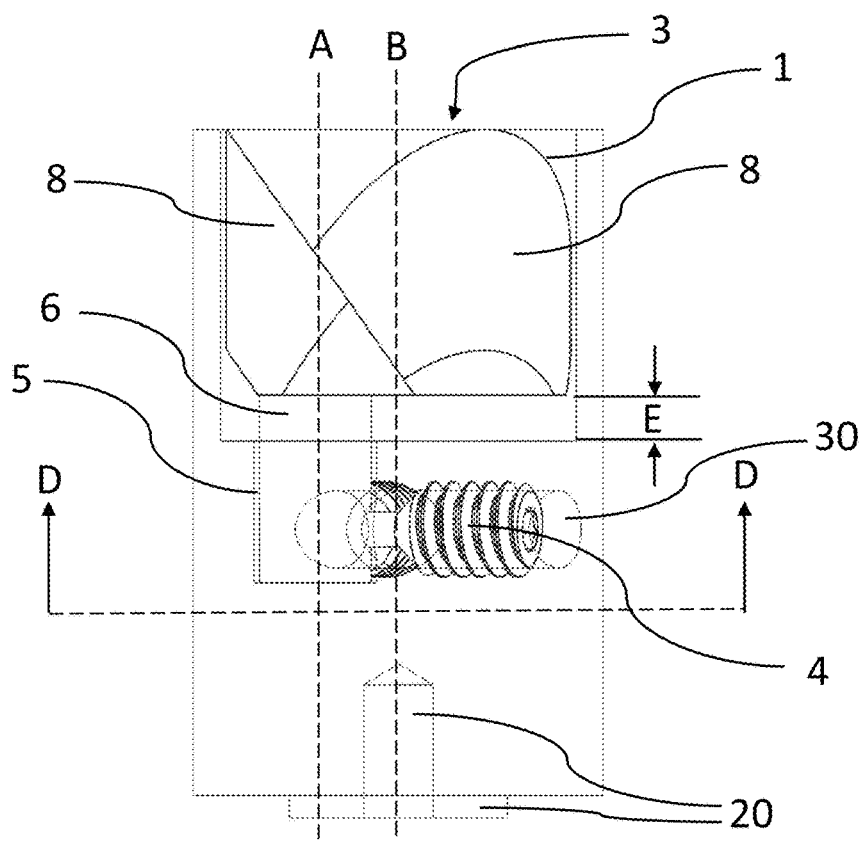
FIG. 4 is a transparent elevational view of the embodiment of FIG. 1.

As best shown in FIGS. 1 and 4, the retroreflector-post assembly is inserted into housing 2 through an opening 3 in the housing. Opening 3 extends only partially through housing 2, but is deep enough to allow for all of retroreflector 1 to be received into the housing. Distance E (shown in FIG. 4) is variable. At the bottom of opening 3 is another, smaller opening 5 for receipt therein of post 6. In a preferred embodiment, the bottom of post 6 rests on the bottom of opening 5. However, and in order to avoid the situation where the bottoms of either, or both, of opening 5 or post 6 are not flat, it is also anticipated that the bottom of post 6 will not touch the bottom of opening 5.

Once retroreflector 1 is centered within housing 2, with post 6 extending into opening 5, at least one mounting screw 4 is screwed into the housing through a hole 30 formed in the side of housing 2 and adapted to receive and allow for tightening of screw 4 therein. In particular, hole 30 can be threaded so that as an end of screw 4 comes into contact with a side surface of post 6, screw 4 pushes post 6 against an opposite side of opening 5. Screw 4 is then tightened within hole 30, thereby securing the retroreflector-post assembly with housing 2. Alternatively hole 30 can be used in conjunction with other connection means such as a threaded insert, so as to secure screw 4 (see discussion of FIG. 7 below).

Figure 5:
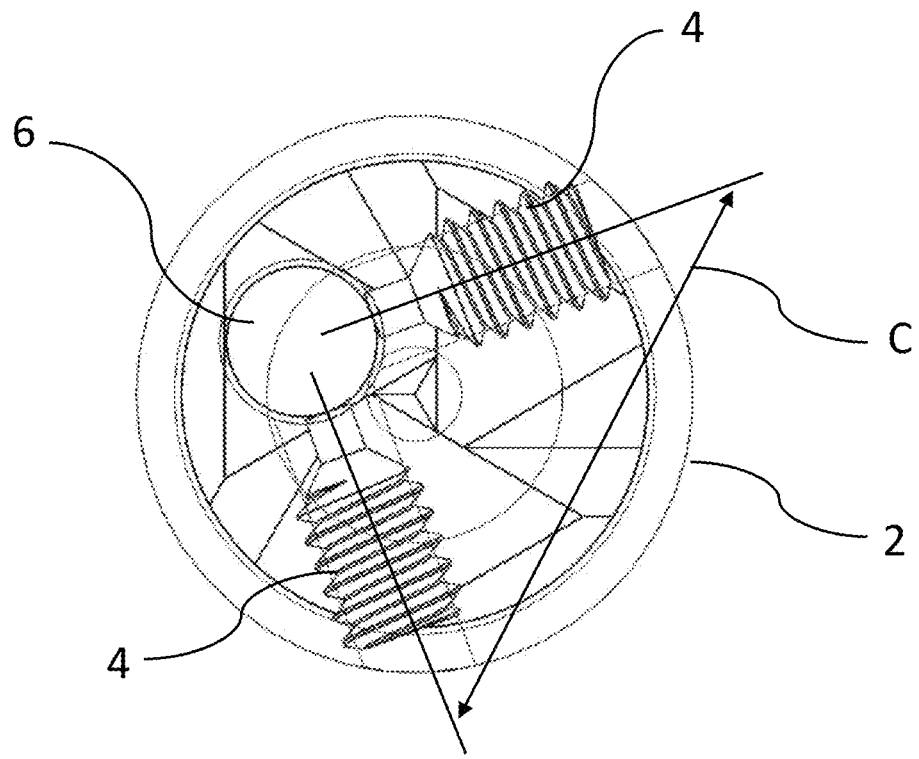
FIG. 5 is a cross-sectional view taken along line D-D of FIG. 4.
Figure 6:
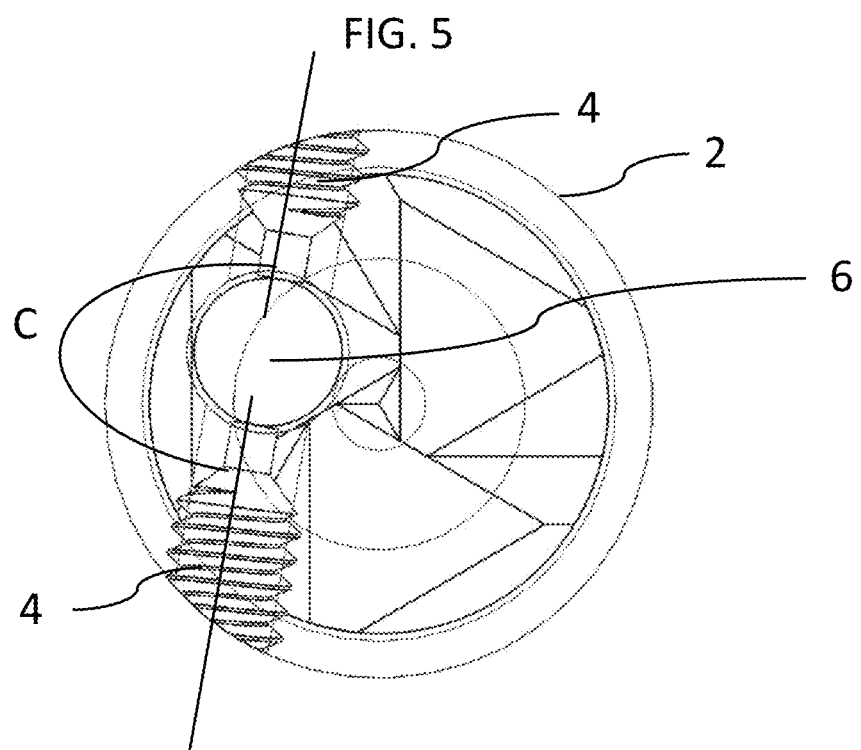
FIG. 6 is a cross-sectional view taken along line D-D of FIG. 4, but showing an alternative embodiment for the endless configurations of mounting screws 4.

As best seen in FIGS. 5 and 6, if more than one mounting screw is used, the angle (angle "C") therebetween can vary between acute, perpendicular and obtuse, including linearly (FIG. 6). As stated, it is the tightening of the mounting screw(s) 4 against the side(s) of post 6 that secures retroreflector 1 within housing 2. While it is preferable that the mounting screw(s) press the post against the wall of the hole, for example when only one or two screws are used, it is also anticipated that three screws (not shown) may be used so that post 6 does not touch the wall of opening 5, but is instead secured via the pressures asserted thereon between the three screws. This same connection achieved with three screws 4, is also achieved in the linear configuration of two screws, as shown in FIG. 6. Additionally, other mounting or connection methods may be used in conjunction with any combination of screws.

Mounting post 6 and mirror panels 8 of the retroreflector are preferably made of the same material, namely, glass, and most preferably fused quartz. Post 6 does not need to be perpendicular to the reflective surface of the optical element from which it extends (as for example, one of the reflective surfaces of any of mirror panels 8 of retroreflector 1). As seen in FIG. 4, longitudinal axis A-A runs through the center of post 6, and is substantially parallel to the optical axis B-B of the optical assembly from which it extends; i.e., the optical axis B-B of retroreflector 1 in a preferred embodiment. As such, post 6 may extend from any of the non-reflective sides of the optical assembly, as is best shown in FIGS. 1, 4, 8, 11 and 14. For example, in the embodiments of FIGS. 1 and 8, post 6 extends from a side of one of the mirror panels 8 of retroreflector 1; i.e., where the "side" is a surface substantially defining a thickness of a mirror panel 8 located between the reflective surface and a back surface of the mirror panel. By way of a further example, in the embodiment of FIG. 11, post 6 extends from the back surface of the mirror panel 8.

Post 6 will preferably be cylindrical in shape, although other shapes are anticipated herein. For cylindrical posts 6 their diameter will depend upon the size of the retroreflector, as it is desirable that the cross-sectional diameter of the post be smaller than the thickness of the mirror panel to which it is to be adhered. The cross-sectional diameter of the post is preferably smaller than the surface to which it is bonded.

The embodiment of FIG. 7 is essentially the same as the embodiment of FIGS. 1-6, except for the addition of the earlier discussed threaded insert. In particular, FIG. 7 shows that a threaded insert 40 may be inserted into openings 30. Such inserts 40 allows for holes 30 to be created with substantially smooth, non-threaded inner surfaces and for holes 30 to be made to be threaded through insertion of the threaded inserts 40. In a preferred embodiment, threaded insets 40 are secured within holes 30 through use of adhesive known in the art or chemical compounds. However, it is also anticipated that a friction fit of threaded inserts 40 can be used, thereby not requiring any adhesive or chemical compound. Even further, a friction fit of threaded inserts 40 with the added securing feature of pressure exerted to maintain inserts 40 within openings 30 from the screwing insertion of screws 4 into holes 30; i.e., inserts 40 are snuggly received within openings 30 and then they are tightened therein when screws 4 are tightened against post 6. It is anticipated that this screw-tightening pressure is achieved by making the threaded opening in inserts 40 smaller in diameter than the thickness of screws 4, so that as screws 4 are screwed in, they exert radial pressure which secures inserts 40 within openings 30.

Figure 9:
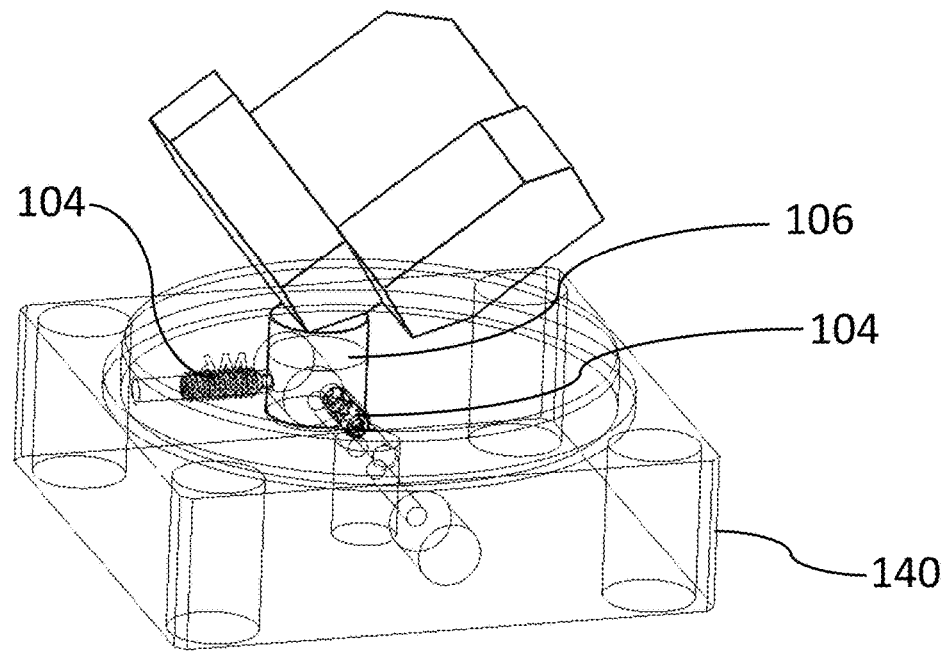
FIG. 9 is a transparent perspective view of the embodiment of FIG. 8.
Figure 10:
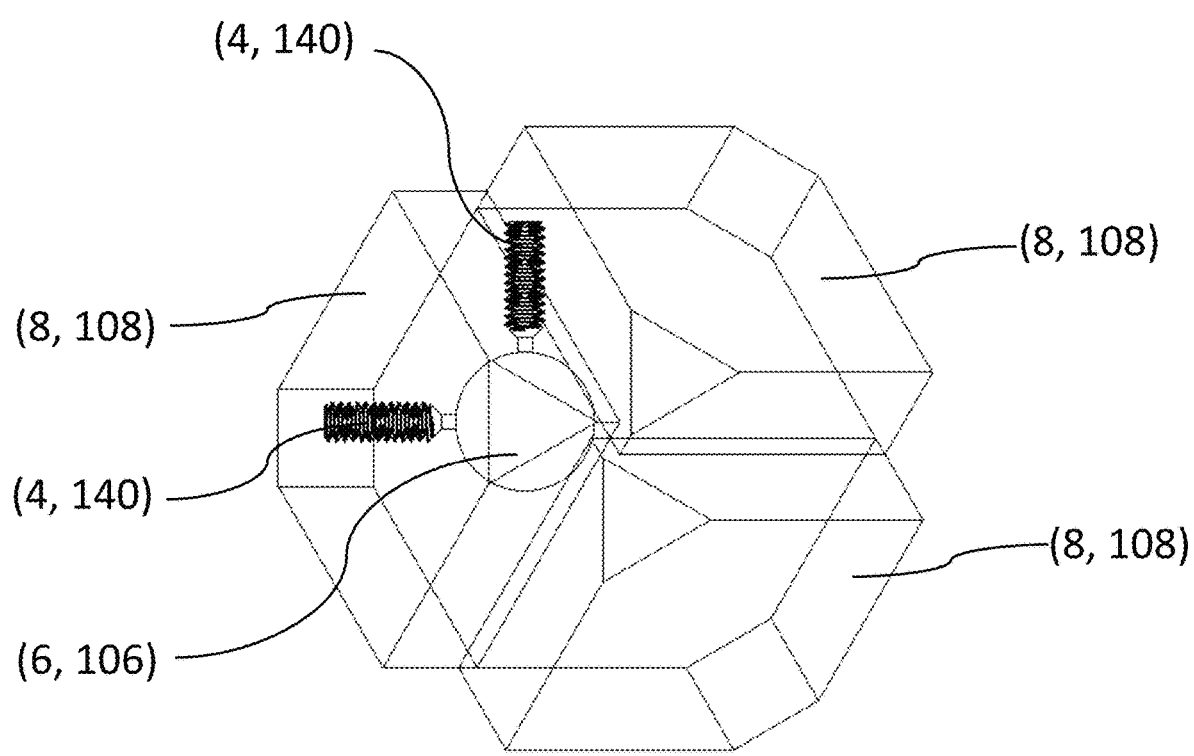
FIG. 10 is a transparent bottom plan view of the retroflector, mounting post and mounting screws of the embodiments of FIGS. 1, 7 and 8.
Figure 11:
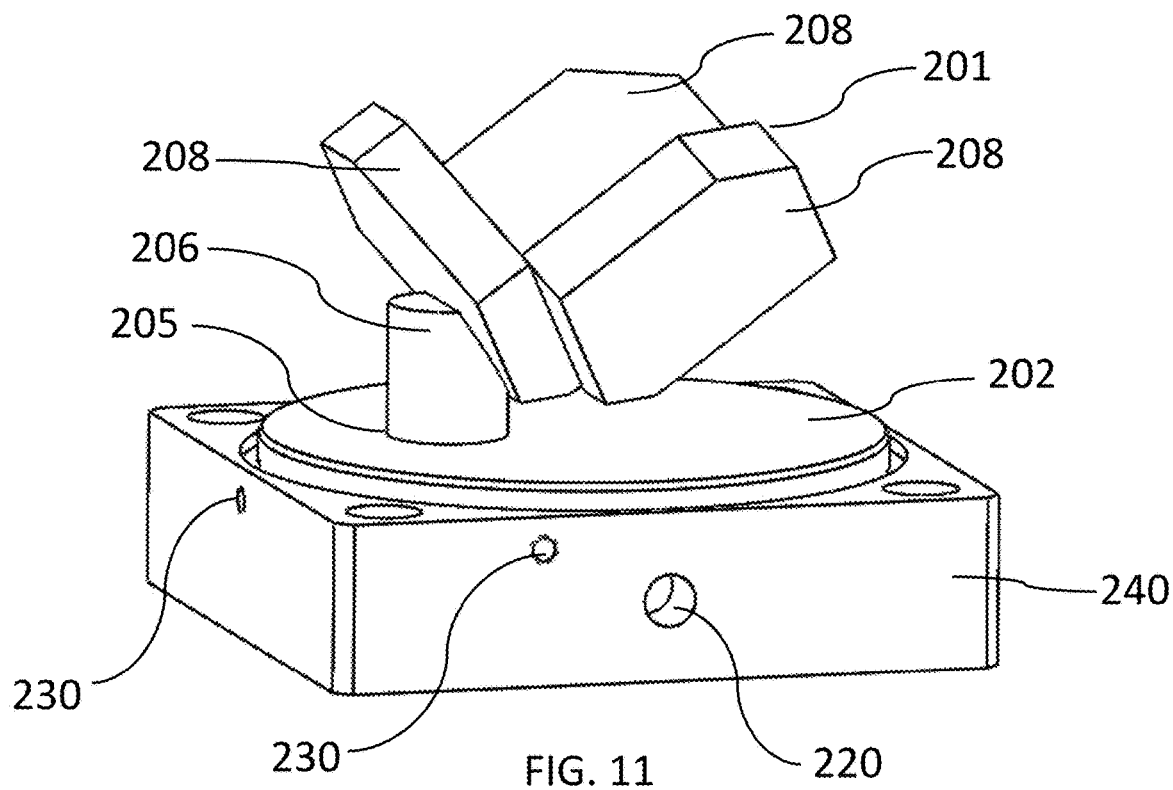
FIG. 11 is a perspective view of an additional embodiment of the invention.
Figure 12:
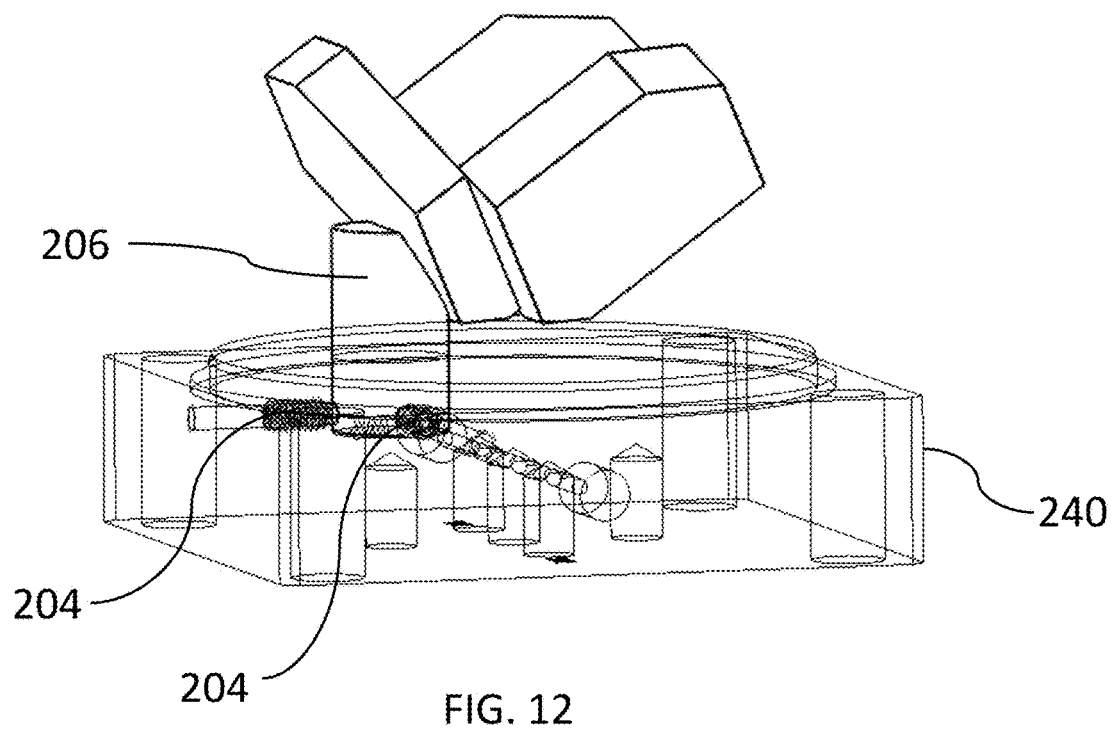
FIG. 12 is a transparent perspective view of the embodiment of FIG. 11.
Figure 13:
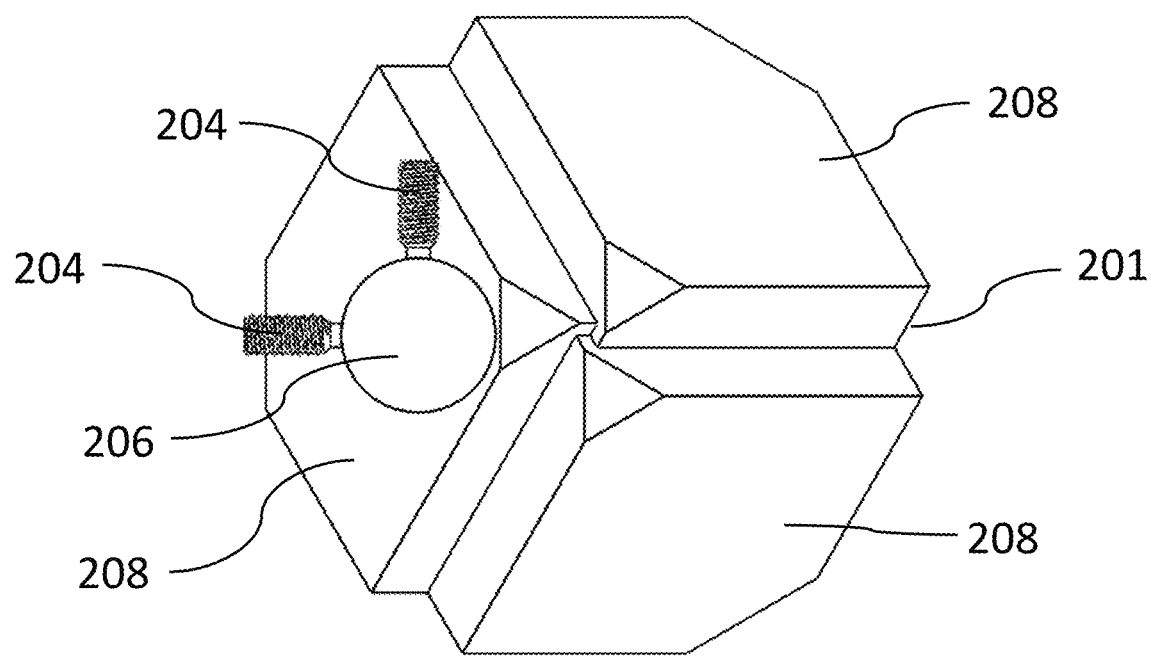
FIG. 13 is a bottom plan view of the retroreflector, mounting post and mounting screws of the embodiment of FIG. 11.
Figure 14:
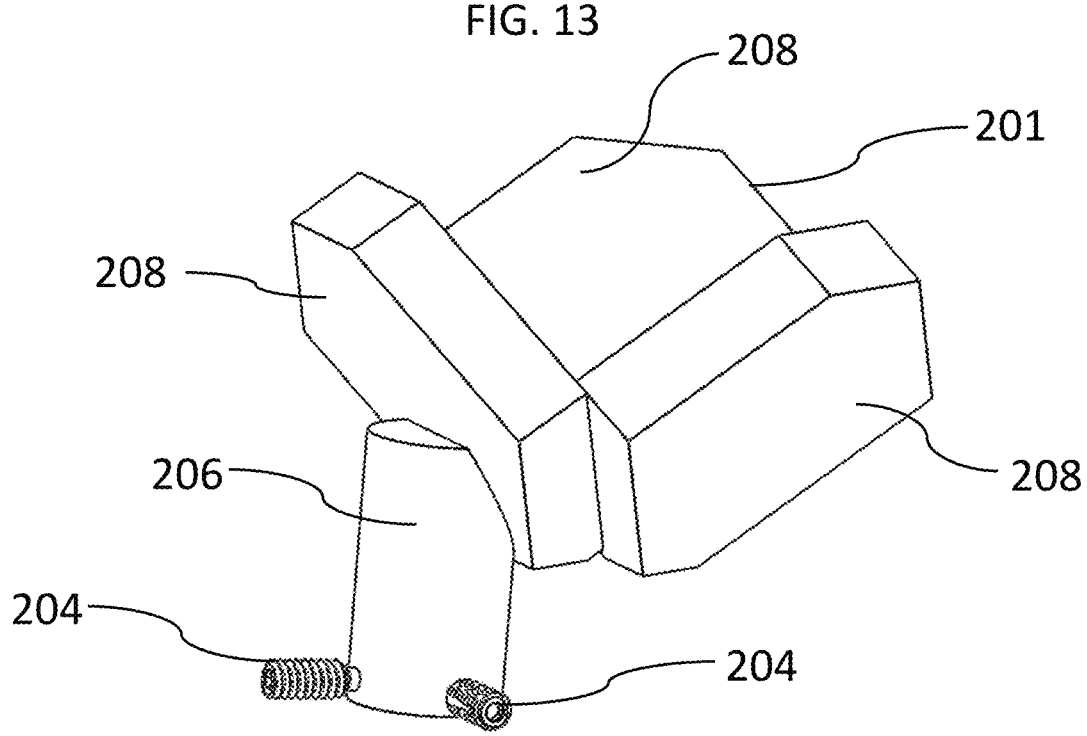
FIG. 14 is a perspective view of the retroreflector, mounting post and mounting screws of the embodiment of FIG. 11

Turning now to the embodiment of FIGS. 8 and 9, there is retroreflector 101, comprising mirror panels 108, a housing 102, a post 106, and holes 130 for receipt therein of screws 104. In this embodiment it is seen that housing 102 need not receive the entirety of the retroreflector-post assembly. Instead, only part of post 106 is received into housing 102 through opening 105. Thereafter, post 106 is secured to housing 102 via the same process as for the embodiment of FIGS. 1-6, namely, by inserting screws 104 into holes 130 and tightening the same until they press post 106 into secure contact with the inside wall of opening 105. As with the embodiment of FIGS. 1-6, there is at least one hole 130 for receipt of one screw 104, and it is anticipated that a plurality of openings and screws may be used to secure post 106 within opening 105. It is also anticipated that any angle may exist between screws 104, similar to angle C of FIGS. 5 and 6.

The embodiment of FIGS. 8 and 9 also shows the housed retroreflector-post assembly's interaction with another structure 140 to which the assembly is secured through attachment means 120. As with the other embodiment, attachment means 120 is anticipated to be and include any known in the art manner of securing/attaching together the structures of this disclosure.

Turning now to the embodiment of FIGS. 11-14, there is retroreflector 201, comprising mirror panels 208, a housing 202, a post 206, and holes 230 for receipt therein of screws 204. In this embodiment it is seen that housing 202 need not receive the entirety of the retroreflector-post assembly. Instead, only part of post 106 is received into housing 202 through opening 205. Thereafter, post 206 is secured to housing 202 via the same process as for the embodiment of FIGS. 1-6, namely, by inserting screws 204 into holes 230 and tightening the same until they press post 206 into secure contact with the inside wall of opening 205. As with the embodiment of FIGS. 1-6, there is at least one opening 230 for receipt of one screw 204, and it is anticipated that a plurality of openings and screws may be used to secure post 206 within opening 205. It is also anticipated that any angle may exist between screws 204, similar to angle C of FIGS. 5 and 6.

The embodiment of FIGS. 11-14 also shows the housed retroreflector-post assembly's interaction with another structure 240 to which the assembly is secured through attachment means 220. As with the other embodiment, attachment means 220 is anticipated to be and include any known in the art manner of securing/attaching together the structures of this disclosure.

The length of posts 6, 106 and 206 can vary.

Housings 2, 102 and 202 can be made from any material.

The method of assembly of the structure is self-evident from the above description, but essentially covers the steps of extending the post from one of the mirror panels, inserting the combined retroreflector and post into the housing with the post entering first, inserting the mounting screw(s) into their respective holes and tightening same against the post and ensuring that the retroreflector is centered within the housing through adjustments made via tightening/loosening of one or more of the mounting screws.

It will thus be seen that the objects set forth above, among those made apparent from the preceding description, are efficiently attained, and, since numerous/certain changes may be made in the above constructions without departing from the spirit and scope of the invention, it is intended that all matter contained in the above description and shown in the accompanying drawings shall only be interpreted as illustrative and not in a limiting sense.

It is also to be understood that the following claims are intended to cover all of the generic and specific features of the invention herein described, and all statements of the scope of the invention which, as a matter of language, might be said to fall therebetween.

The invention claimed is:

1. A mount assembly for an optical structure, comprising:
    an optical structure comprising at least one mirror panel, the mirror panel comprising a reflective surface, a back surface substantially opposite the reflective surface and at least one side surface extending between the reflective and back surfaces;
    at least one mounting member extending from the optical structure;
    a housing for receipt therein of at least a portion of the optical structure and all of the mounting member extending from the optical structure, the housing having at least one opening therethrough; and
    at least one screw received and tightened within the at least one opening such that a first end of the screw presses against and at least partially secures the mounting member within the housing.

2. A mount assembly comprising:
    an optical structure comprising at least one mirror panel, the mirror panel comprising a reflective surface, a back surface substantially opposite the reflective surface and at least one side surface extending between the reflective and back surfaces;
    at least one mounting member extending from the optical structure;
    a housing for receipt therein of at least a portion of the optical structure and all of the mounting member extending from the optical structure, the housing having at least one opening therethrough;
    at least one screw received and tightened within the at least one opening such that a first end of the screw presses against and at least partially secures the mounting member within the housing; and
    at least one threaded insert received within the at least one opening of the housing for receipt within the at least one screw.

3. The mount assembly of claim 1, wherein the optical structure is any of the group or any combination thereof, of a hollow retroreflector, a roof mirror, or a mirror panel.

4. The mount assembly of claim 1, wherein the mounting member is adhered to the optical structure.

5. The mount assembly of claim 1, wherein the mounting member is a post.

6. The mount assembly of claim 1, wherein the entirety of the optical structure and mounting member are received within the housing.

7. The mount assembly of claim 1, wherein the mounting member extends from the at least one side surface of the at least one mirror panel.

8. The mount assembly of claim 1, wherein the mounting member extends from the back surface of the at least one mirror panel.

9. The mount assembly of claim 1, further comprising means for mounting the assembly to another structure.

10. A method of mounting an optical structure within a housing comprising a first opening, a second opening and at least one third opening, comprising the steps of:
    extending a mounting member from a portion of the optical structure;
    inserting all of the mounting member and at least a portion of the optical structure into the first opening in a housing;
    inserting at least a portion of the mounting member into the second opening in the housing;
    inserting a screw into the at least one third opening in the housing; and
    tightening the screw within the at least one third opening so that a first end of the screw presses against a portion of the mounting member received within the second opening, thereby securing the mounting member within the housing and at least partially securing the optical structure within the housing.

11. The method of mounting an optical structure as recited in claim 10, further comprising the additional inserting step prior to the screw inserting step, of inserting a threaded insert into the at least one third opening.

12. The method of mounting an optical structure as recited in claim 10, the extending step comprising unitarily forming the mounting member from the optical structure so that it extends from the optical structure.

13. The method of mounting an optical structure as recited in claim 10, the extending step comprising attaching the mounting member to the optical structure so that it extends from the optical structure.

14. The method of mounting an optical structure as recited in claim 10, wherein the second opening of the housing is opposite the first opening of the housing.

* * * * *